Figure 1:
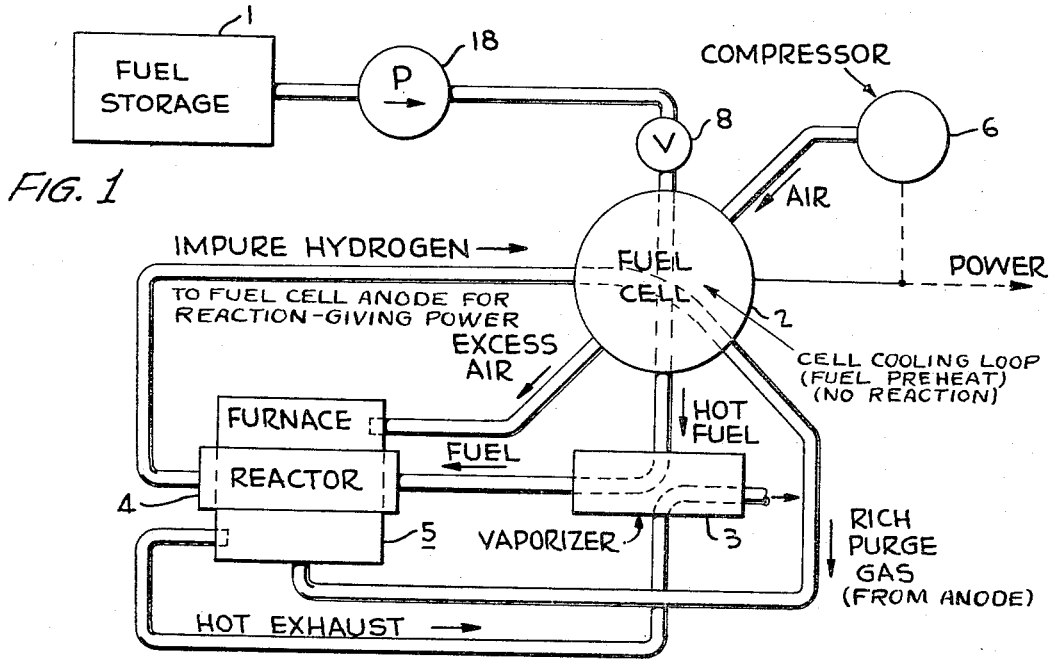

INVENTOR
NIGEL I. PALMER
BY
Watson, Cole, Grindle & Watson
ATTORNEYS

May 23, 1967  N. I. PALMER  3,321,333
FUEL CELL SYSTEM
Filed July 11, 1962  3 Sheets-Sheet 2

INVENTOR
NIGEL I. PALMER
BY
Watson, Cole, Grindle & Watson
ATTORNEYS

May 23, 1967   N. I. PALMER   3,321,333
FUEL CELL SYSTEM
Filed July 11, 1962   3 Sheets-Sheet 3

INVENTOR
NIGEL I. PALMER
BY
Watson, Cole, Grindle & Watson
ATTORNEYS

United States Patent Office 3,321,333
Patented May 23, 1967

3,321,333
FUEL CELL SYSTEM
Nigel I. Palmer, New York, N.Y., assignor to Leesona Corporation, Warwick, R.I., a corporation of Massachusetts
Filed July 11, 1962, Ser. No. 209,079
8 Claims. (Cl. 136—86)

This invention relates to an improved fuel cell system. More particularly, it relates to a fuel cell system utilizing a non-porous palladium-silver alloy hydrogen diffusion membrance, a conventional cathode and an aqueous electrolyte, characterized by the insitu formation of hydrogen fuel. The system has a minimum of energy loss due to heat waste and unconsumed fuel.

In general fuel cells, as the term is used in the art, are devices which convert the energy of a chemical reaction between a fuel and oxidant directly into low voltage, direct current electricity. Thus, the basic problem encountered in obtaining an efficient system is essentially one of chemical kinetics. It is necessary to carry out the reaction of the fuel and oxidant so that the portion of energy degraded into heat is as small as possible. At the same time, the reaction rates must be high enough to economically provide sufficient current output from a practical sized ceil.

A typical cell comprises a housing, a fuel electrode, an oxidizing electrode, an electrolyte positioned between the electrodes, and means for the introduction of fuel and oxidant to the respective electrodes. In operation the fuel enters the anode or positive side of the cell and impinges on the electrode at a fuel-electrolyte interface of the anode, where the fuel reacts with an ionic oxidizing agent leaving the electrode electrically charged. The electric charges are drawn off through an external route to generate more of the oxidizing ions at the cathode. These ions then migrate to the anode to complete the circuit.

Fuel cells are highly attractive commercially due to the cells potential efficiencies. Thus, in comparison with a gas turbine a fuel cell has an unlimited theoretical output with cells having been constructed having efficiencies of up to about 90%. A gas turbine on the other hand, has a maximum efficiency of only about 30% due to Carnot's Heat Law. In comparison with conventional batteries, a fuel cell has a longer possible lifetime, less weight on a kilowatt hour per lb. basis, higher efficiency, lower heat and simpler design.

Despite the potential advantages of a fuel cell, prior art units are not completely practical from a commercial standpoint since they generally cannot deliver high currents or high voltages at the required low temperatures of operation. Recently, however, hydrogen-oxygen cells have been constructed employing non-porous palladium-silver alloy hydrogen diffusion anodes which are capable of providing high current densities in a practical sized cell operating at practical temperatures. Such cells when cascaded or stacked and connected in series or parallel will provide substantially any power requirement. However, due to the relatively poor economics and logistics of hydrogen as a fuel in fuel cells an effort has been directed toward the use of more convenient fuels, such as ammonia, methanol, the hydrocarbons, etc. However, the research on such fuels has shown low current densities and relatively poor conversion efficiencies on direct oxidation in fuel cells, at least at practical operating temperatures.

It has now been discovered that the advantages of hydrogen as a fuel with the economic and logistic advantages of ammonia, methanol, methane, propane, etc, may be obtained by prereacting these fuels in a catalytic converter to produce a fuel stream containing up to about 75% hydrogen. The stream of impure hydrogen is fed to a fuel cell employing non-porous palladium-silver alloy hydrogen diffusion anodes. The non-porous palladium-silver alloy hydrogen diffusion anodes will only permit the passage of pure hydrogen, thus, the impurities in the fuel stream merely act as inerts and cannot reach the electrolyte. Surprisingly, the efficiencies of the fuel cell system utilizing the indirect oxidation of the conventional fuels is as high as in cells relying on the direct oxidation of hydrogen.

Accordingly, it is an object of the instant invention to provide a fuel cell system which employs a low price fuel.

It is another object of the invention to provide a fuel cell system which has a low energy loss due to heat waste and unconsumed fuel.

It is another object of the invention to provide a fuel cell system, utilizing an economical fuel, which is relatively mobile.

It is another object of the invention to provide as a composite system, a hydrogen-air fuel cell which indirectly employs a low-price fuel, but which has the efficiency of a pure hydrogen-oxygen system.

These and other objects of the instant invention will become more apparent from the following detailed description with particular emphasis being placed on the illustrative drawing and working embodiment.

In accordance with the instant invention, a fuel cell system is constructed having in combination a hydrogen-oxygen or hydrogen-air fuel cell and a means of producing hydrogen in situ, from a low price fuel such as ammonia, methanol, methane, propane, etc. As characteristic features, the fuel cell employs a hydrogen diffusion electrode which permits the direct utilization of an impure hydrogen fuel, and eliminates to a substantial extent the energy loss due to the discharge of unreacted and unconsumed fuel. Thus, the basic components of the system include a fuel storing unit, a fuel cell unit, and a catalytic reactor unit for the conversion of the fuel into impure hydrogen.

The fuel cell unit employed necessarily contains non-porous palladium-silver alloy hydrogen diffusion membrane electrodes. Thus, since only hydrogen is diffused through the membrane impure hydrogen containing carbon dioxide, carbon monoxide, water, methane, etc. can be used as the fuel. Pure hydrogen will diffuse through the membrane and the impurities vented from the system. The impurities, being retained in the fuel compartment of the cell, cannot contaminate the electrolyte or block the electrode.

The reactor is employed to convert a fuel such as liquid ammonia, hydrocarbons, etc. into hydrogen. A conventional heat converter containing a catalytic substance can be employed, such as a tubular reactor having baffles which ensure good contact of the fuel with the catalyst. The heat for the converter is supplied directly from the fuel cell, and preferably by burning the purge gases from the fuel cell. Alternatively, some of the electrical current produced in the fuel cell can be utilized as the source of heat.

Figure 2:
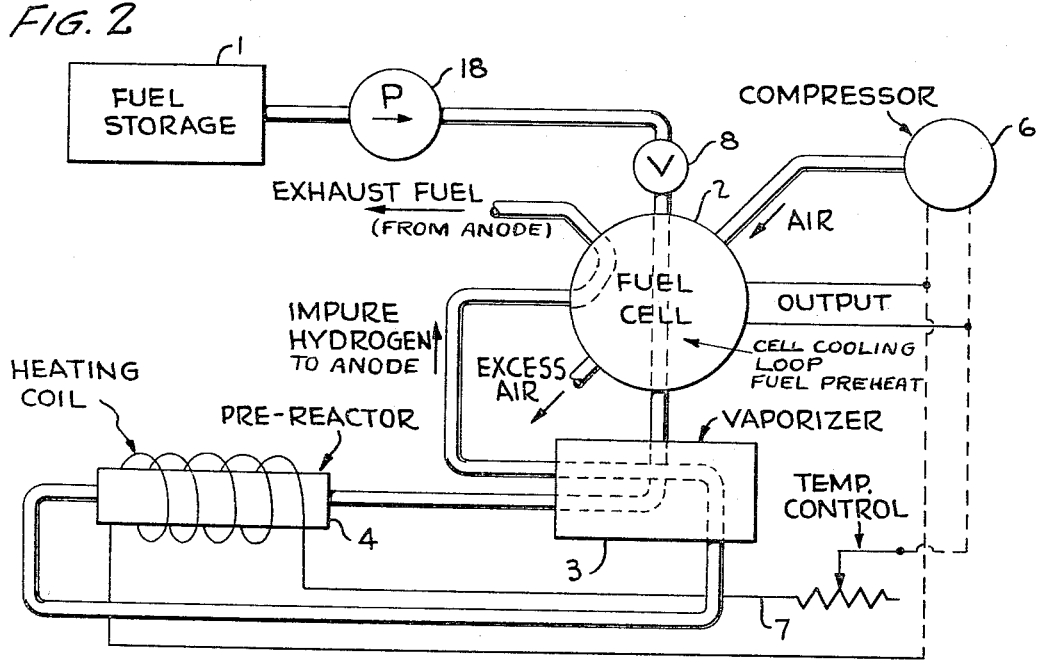
Figure 3:
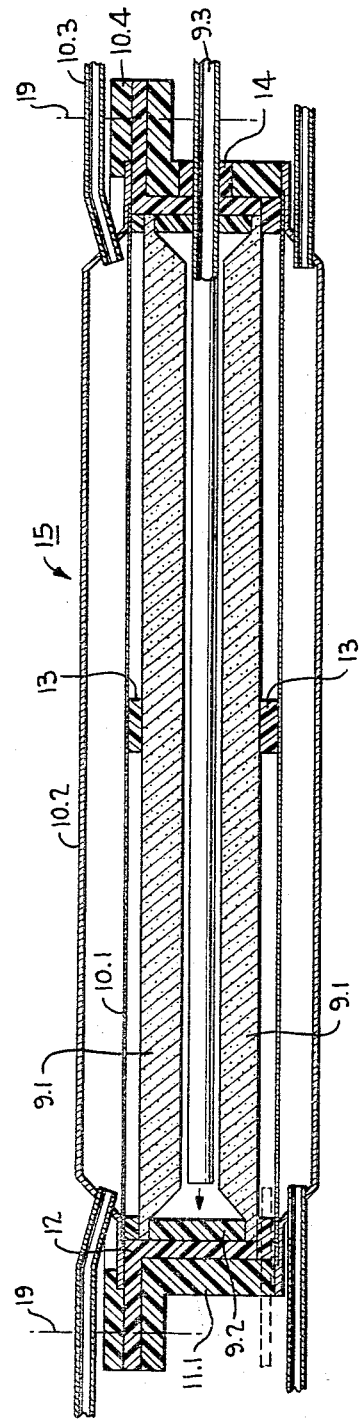
Figure 4:
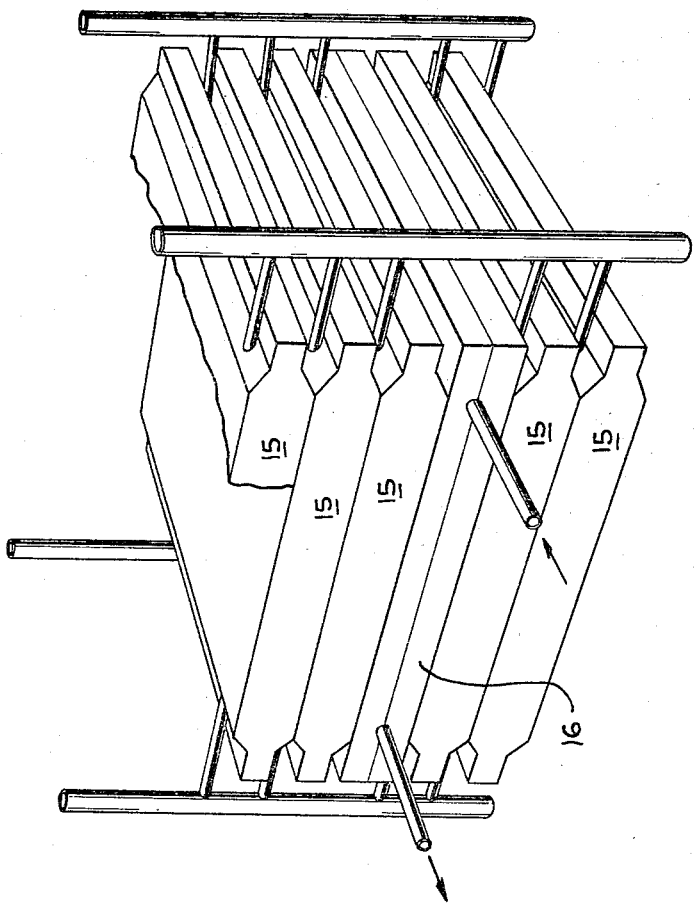
Figure 5:
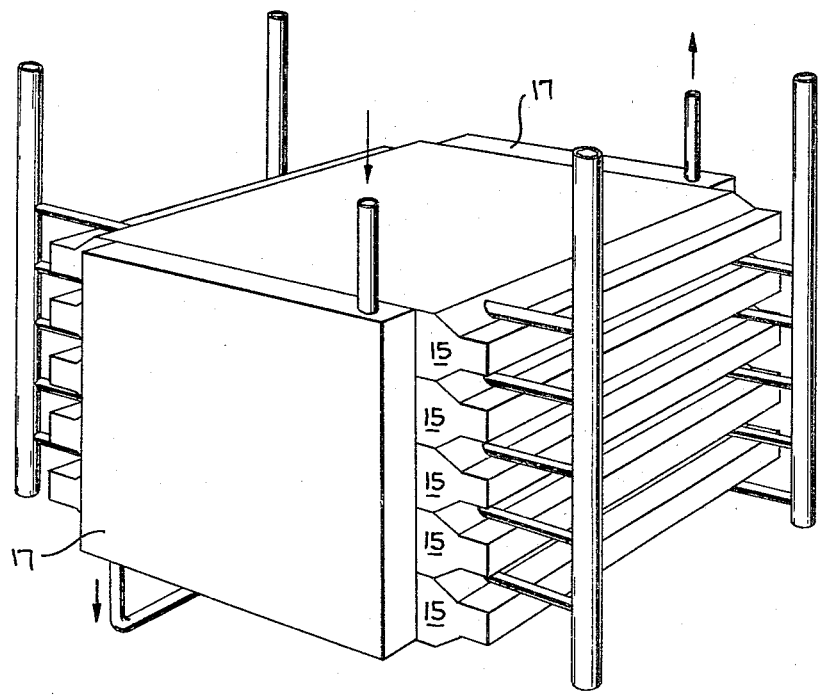

Thus, referring to the drawing, FIGURE 1 illustrates schematically, a preferred fuel cell system wherein the pre-reactor heat is produced by burning the purge gases containing unconsumed fuel. FIGURE 2, illustrates a second embodiment where the pre-reactor heat is obtained by utilizing a portion of the electrical energy produced by the fuel cell. FIGURE 3 illustrates a design of a fuel cell module which can be employed herein. FIGURES 4 and 5 illustrates, diagrammatically, fuel cell units which utilize the waste heat of the fuel cell to preheat or vaporize the fuel prior to its entrance into the reactor. The latter units accomplish the removal of waste heat from the cell, and further permits faster conversion of the fuel within the reactor unit.

Referring more particularly to the drawings, in FIGURE 1 liquid fuel from storage unit 1 is passed through fuel cell unit 2 to pre-heat or vaporize the fuel prior to introduction into the converter unit. Vaporizer or superheater unit 3 may be employed in the system, if necessary, to further heat the fuel prior to introduction into the reactor unit. The fuel is then passed into a catalytic reactor 4 where the fuel is converted into hydrogen and by-products. The impure hydrogen stream is fed into the fuel compartments of the fuel cell 2 where it is consumed. In the fuel cell, to have efficient operation, it is necessary to introduce the fuel at a sufficient rate in order that at the exhaust end of the fuel compartment, enough hydrogen is still present in the stream to have efficient reaction within the anode. When this is done the purge stream vented from the fuel cell necessarily is rich in hydrogen and nitrogen. Ordinarily, this unconsumed fuel is lost, or it is necessary to recover the fuel at substantial expense. In the instant system, the rich purge gas is vented from the fuel cell to a furnace 5 where it is consumed to provide heat for conversion of the fuel. Compressor 6 pumps air into the oxidant chamber of the fuel cell where part is consumed by the oxidizing electrode and the excess vented off into the furnace to oxidize the combustion.

FIGURE 2 is a second embodiment wherein a small portion of the electrical current produced in the fuel cell is employed to supply heat for the catalytic reactor. Thus, liquid fuel from storage unit 1 is passed through fuel cell units 2 to preheat or vaporize the fuel prior to its introduction into the converter unit. Vaporizer or superheater unit 3 may be employed in the system. The fuel is then passed into a catalytic reactor 4 where the fuel is converted into hydrogen and by-products. The impure hydrogen stream is fed into the fuel compartment of fuel cell 2 where it is consumed. Prior to introduction of the hydrogen fuel stream into fuel cell 2 it may be circulated through vaporizer 3 to supply at least part of the heat for the vaporizer unit. Compressor 6 pumps air into the oxidant compartment of the fuel cell where it is consumed. As noted hereinbefore, a portion of the electrical power produced by the fuel cell is fed to resistance windings around the tubular pre-reactor and the heat requirements produced by the passage of current through these windings.

While the system depicted in FIGURE 2 is not as efficient in terms of overall energy output as the system of FIGURE 1 the advantages of the system are compactness and easy operation making it particularly suitable for small mobile applications. Activation or start up of the unit is achieved with small outside power sources, for example a storage battery.

FIGURE 3 illustrates a cross section, a typical fuel cell unit which can be employed in the instant system. Thus the unit is composed of individual modules which may be stacked or cascaded to provide the required voltage or amperage. Thus, if a high voltage is needed, the modules may be connected in series, or if a high current output is necessary the modules can be connected in parallel. In the unit shown, each module is a completely independent unit and contains its own electrolyte. However, units having a common electrolyte can be used in the instant systems. In the unit illustrated having its own electrolyte, in operation if one module of the cell becomes defective, it is a simple matter to replace the module, or to disconnect the module from the system without physically replacing the units. The fuel cell module of FIGURE 3 and alternative modules which are particularly well suited for use in the instant system are described more completely in the co-pending applications to J. Delfino, Serial No. 203,056 and Serial No. 203,057, both filed June 18, 1962. Thus, the module contains a double cathode assembly 9 made of two bi-porous cathodes 9.1 attached back to back to a metal separator 9.2 and including gas ports 9.3 for entry and exit of air. Anode assembly 10 consists of a palladium silver alloy membrane 10.1 welded or brazed to a metal back-up plate 10.2. The back-up plate is shaped to form a gas chamber behind the anode and has two diametrically opposed gas ports 10.3 welded to it for entry and exit of hydrogen. In addition a clamping 10.4 is welded to the back-up plate. Anode assembly 11 is identical to assembly 10, except that the clamping plate is replaced by flanged cylinder 11.1 welded to the back-up plate. The cylinder serves as a container for the cathodes and electrolyte. Teflon insulator 12 insulates the cathode from the anode cylinder and serves as a sealing gasket between the flange and clamping ring. Teflon spider 13 controls the gap between the anode and cathode which space is filled with electrolyte. Thus, the thickness of the Teflon spider determines the electrolyte volume. Additionally, the Teflon spider supports the electrodes against gas pressure. Teflon bushing 14 insulates the cathode gas ports from the anode housing.

The modules described hereinbefore are particularly convenient where it is desirable to heat or vaporize the fuel gas prior to introduction into the pre-reactor, thereby utilizing the heat waste. Thus, in stacking it is possible to intermittently insert "dummy" units composed, for example, of two flat sheets of copper pressed together having internal channels. In this manner, the liquid fuel is passed into the fuel cell unit 2 where it is vaporized or heated by the waste heat of the fuel cell. Thus, when the fuel is liquid ammonia, the fuel, in going from a liquid to a gas, will act substantially as a refrigerant, cooling the fuel cell unit and vaporizing the fuel prior to entrance of the fuel into the reactor. In this case unit 3 in FIGURE 1 represents a superheater. In operation valve 8 is located immediately adjacent the fuel cell. FIGURE 4 illustrates a fuel cell unit composed of several individual modules, 15 interspersed with "dummy" units 16 of removing the waste heat and pre-heating or vaporization of the fuel.

FIGURE 5 illustrates, diagrammatically, a second fuel cell unit wherein cooling coils 17 are positioned externally in relation to the actual fuel cell. This system is preferred when the fuel is being primarily preheated and not vaporized. When such a unit is employed it is desirable to insert vaporizer 3 into the system.

In the instant systems the fuels employed for producing the impure hydrogen for consumption in the fuel cell include ammonia, the lower molecular weight hydrocarbons and the lower molecular weight alcohols. It is possible to employ other liquid fuels which are capable of being converted into hydrogen and by-products. As will be apparent, depending upon the particular requirements, certain fuels may be more desirable in a given system, or a particular system may be more desirable for certain applications. Thus, for use in a mobile unit, the system illustrated in FIGURE 2 would probably be a preferred embodiment, operated with ammonia as the fuel. In such a unit, the ancillary equipment required is minimized, greatly reducing the space requirements. Liquid ammonia being under a slight pressure, will flow from the storage unit into the fuel cell unit. The ammonia will be caused to flash vaporize directly within the fuel cell unit prior to its passage into the fuel converter, cooling the fuel cell and at the same time utilizing the waste heat by opening valve 8. In the converter the fuel is converted into hydrogen and by-products. The heat for the converter is supplied directly from the fuel cell by passing part of the electric current produced through resistance windings.

In a system where mobility of the unit is not particularly important, primarily because of the overall economy and increased efficiency, the fuel cell system illustrated in FIGURE 1 may be preferred. The system of FIGURE 1 can make use of either ammonia or the low molecular weight hydrocarbons and alcohols as the fuel. Proper selection of the fuel depends upon fuels commercially available. However, in a fuel cell unit employing ammonia or the lower molecular weight hydrocarbons, it is not necessary to use a pump to transfer the fuel from the storage unit to the fuel cell. Ordinarily, lower molecular weight hydrocarbons having from 1 to 5 carbon atoms such as methane, propane or butane will be more economical than ammonia. Additionally, liquid ammonia and the normal gaseous hydrocarbons will usually provide more convenient and efficient cooling of the fuel cell unit by vaporization directly within the unit. However when it is essential to obtain increased cooling of the cell, vaporization of normally liquid hydrocarbons and alcohols can be caused to occur within the fuel cell unit by heating the fuel prior to its entrance into the fuel cell unit, thereby increasing its cooling capacity. Thus, upon passage of the hot fuel into the fuel cell at a lower pressure, flash vaporization will occur. As is apparent, therefore, proper selection of the fuel will provide beneficial modifications in the instant system. These modifications are within the ability of one skilled in the art having the instant specification, particularly the illustrative examples as a guide.

In the instant fuel cell system, it is usually desirable to employ catalytic materials in the reactor to obtain efficient conversion of the fuel. The proper catalyst to be selected depends primarily upon the fuel which is to be used. The selection of the catalyst forms no part of the instant invention and can be chosen from the prior art knowledge; however, for a guide, methanol decomposition is conveniently carried out over various oxide catalysts. Thus, a preferred catalyst is zinc oxide in admixture with cupric, nickel or chromous oxides in lesser amounts; where methane is employed as the fuel, a nickel based catalyst with various carriers and promoters can be selected.

A further factor to be considered in the selection of the fuel to be employed in the instant systems for the production of impure hydrogen is the temperature at which the different fuels are converted. Thus, ammonia or methanol converters are conveniently operated at temperatures of from about 300–800° C., whereas a methane converter will ordinarily be operated only at temperatures above about 600° C. As an additional factor, when employing methanol or methane it is desirable, if not necessary, to employ a steam jacket or low pressure boiler to circumscribe the furnace and reformer. Thus, as noted hereinbefore less ancillary equipment is needed when ammonia is employed as the fuel. Therefore, selection of the proper fuel will depend to a large extent on equipment requirements, space requirements at the particular place of installation and fuels which are commercially available. These features are within the ability of one skilled in the art with the instant specification as a guide.

The non-porous palladium-silver alloy hydrogen diffusion anodes employed in the instant system are described completely in the Oswin and Oswin et al. co-pending applications, Ser. Nos. 51,515, now U.S. Patent No. 3,092,-517, and 109,695, now abandoned, filed Aug. 24, 1960, and Apr. 27, 1962, respectively. Briefly, however, the anodes are ordinarily constructed from alloys containing from about 5–45% silver with alloys composed of from about 20–35% silver showing optimum fuel cell electrode characteristics. The thickness of the non-porous palladium-silver alloy membrane depends to a large extent upon the pressure differential to be applied across the membrane and upon the rapidity of diffusion desired. Diffusion of hydrogen gas through the membrane is proportional to the pressure differential across the electrode structure and the membrane thickness. Thus, the minimum thickness is immaterial so long as the membrane is structurally able to withstand the necessary pressure of the fuel cell. It is usually desirable, both from the stand-point of hydrogen diffusion and economics, to use extremely thin membranes and support the membrane by external means. The preferred thickness of the membrane is approximately 0.5–10 mils. However, membranes of up to about 30 mils can be employed. The electrodes can be constructed as flat sheets, or it may be desirable to machine the anode structure to obtain a different configuration.

Although the anode can be unactivated non-porous palladium-silver alloy membrane, it is preferred to apply a thin coating of "black" to the membrane to enhance its electro-chemical performance characteristics, as well as protect the electrode against poisoning. The black can be palladium, platinum, palladium-rhodium, or rhodium. However, it has been found that palladium, at least on the fuel gas side of the electrode, provides superior electro-chemical characteristics. Additionally, palladium black has a greater tendency to adhere to the non-porous palladium-silver membrane and therefore is preferred. The blacks employed are obtained by known prior art means and can be deposited on the anode by electrolytic deposition.

The cathodes are either homo-porous or bi-porous structures known in the prior art. The electrodes described by Francis T. Bacon in U.S. Patent No. 2,716,670 are particularly advantageous. These electrodes are bi-porous nickel electrodes having a surface coating of lithiated nickel-oxide. The lithiated nickel-oxide film is highly resistant to oxidation but yet readily conducts an electric current. Other cathodes found particularly effective are the cobalt-nickel oxide electrodes described in the Lieb et al. copending application, Ser. No. 165,212 filed Jan. 9, 1962, now abandoned, entitled "Fuel Cell Electrodes."

The instant fuel cells are operable over a wide temperature range, however, for good palladium-silver anode operation it is desirable that the temperature of the system be in excess of 15° C. and preferably not over about 350° C. The optimum temperature range is in the neighborhood of about 100–200° C.

The instant fuel cell systems are operated with either air or oxygen as the oxidizing agent. However, where economic conditions are primary, air is preferred. Where high performance at the expense of higher cost is needed, oxygen can be used. In the embodiment set forth in FIGURE 1, the excess air is passed from the cell in the heated condition to the reactor furnace where it supports the combustion of the purge gas in the furnace.

Additionally, a variety of electrolytes can be employed in the fuel cells of the instant systems including aqueous alkaline materials such as potassium hydroxide, sodium hydroxide, lithium hydroxide, mixtures thereof, potassium carbonates and the alkanol amines. Acid electrolytes can be used including sulfuric acid and phosphoric acid.

In order to more completely illustrate the instant invention the following preferred embodiments are being set forth. Thus, as one example of the instant invention, a fuel cell system substantially identical to that of FIGURE 2 is constructed employing a fuel cell composed of individual modules, substantially as depicted in FIGURE 3, cascaded as a unit having "dummy" units interspersed intermittently as shown in FIGURE 4. The anode is a non-porous palladium-silver alloy membrane and the cathode is a bi-porous cobalt-nickel oxide activated cathode using scrubbed air at 8.0 p.s.i.g. which is passed through the fuel cell at a rate sufficient to consume only approximately 50% of the available oxygen. The cell is operated at 200° C. with a 25% aqueous potassium hydroxide electrolyte. The reactor is a tubular converter containing nickel oxide as the catalyst.

Liquid ammonia is passed from the fuel storage unit into the fuel cell through valve 8 when it is flash vaporized within the fuel cell unit. The vaporized fuel is passed from the fuel cell into superheater 3 where it is pre-heated before entering the converter 4 operated at 500° C. The stream of hydrogen takes from the converter contains from about 70–75% hydrogen. Heat for the converter is produced by passing a part of the current produced by the fuel cell unit through resistance windings. The reaction unit was activated by use of a small storage battery. The system produces a unit cell voltage of 1.00 volt at 51% system net thermal efficiency.

A second system was devised having a fuel cell substantially as described in the perceding embodiment. However, the pre-reactor heating is achieved by combustion of the purge gas as shown diagrammatically in FIGURE 1. The system provided a unit cell voltage of 1.00 volts at a net system thermal efficiency of 59%.

It should be appreciated that the invention is not to be construed as being limited by the illustrative embodiments. It is possible to produce still other embodiments without departing from the inventive concept herein disclosed.

What is claimed is:

1. A hydrogen-oxidant fuel cell system for the indirect consumption of gaseous and liquid fuels, comprising in combination, a fuel storage unit for storage of said fuels, a reactor unit for converting said fuels into impure hydrogen and a fuel cell unit for converting impure hydrogen and an oxidant into electricity, means interconnecting said fuel storage unit to said reactor unit through said fuel cell unit, whereby fuel from said storage unit is transported to said reactor unit, said fuel cell unit comprising a non-porous palladium-silver alloy hydrogen diffusion anode, a porous cathode, an electrolyte, fuel means for feeding hydrogen, and oxidant means for feeding oxidant to said anode and cathode respectively, means interconnecting said reactor unit with the fuel means of said fuel cell unit, whereby impure hydrogen produced in said reactor unit is transported directly to the anode of said fuel cell unit, energy for heating said reactor unit being provided directly from the fuel cell system.

2. The fuel cell system of claim 1 wherein the heat for the reactor unit is provided by passing a portion of the electrical output of the fuel cell through resistance windings in contact with the reactor unit.

3. The fuel cell system of claim 2 wherein the fuel is ammonia.

4. The fuel cell system of claim 1 wherein the cathode is a bi-porous cobalt activated nickel oxide electrode.

5. The fuel cell system of claim 1 wherein the fuel is a liquid fuel and the waste heat of the fuel cell unit is absorbed by vaporization of the liquid fuel in the vicinity of the fuel cell prior to its introduction into the reactor unit.

6. A hydrogen-oxidant fuel cell system for the indirect consumption of gaseous and liquid fuels, comprising in combination, a fuel storage unit for storage of said fuels, a reactor unit for converting said fuels into impure hydrogen comprising a reactor associated with a combustion furnace and a fuel cell unit for converting impure hydrogen and an oxidant into electricity, means interconnecting said fuel storage unit and reactor unit through said fuel cell unit, whereby fuel from said storage unit is transported to said reactor unit, said fuel cell unit comprising a non-porous palladium-silver alloy hydrogen diffusion anode, a porous cathode, an electrolyte, fuel means for feeding hydrogen to said anode, oxidant means for feeding oxidant to said cathode, and exhaust means for said anode, means interconnecting said reactor unit with the fuel means of said fuel cell unit whereby impure hydrogen produced in said reactor unit is transported directly to the anode of said fuel cell unit, means interconnecting said combustion furnace of said reactor unit with the exhaust means for said anode, whereby the purge gases of said fuel cell are transported to said combustion furnace for consumption.

7. The fuel cell unit of claim 6, wherein the fuel consumed is methanol.

8. The fuel cell system of claim 6 wherein the fuel consumed is a lower molecular weight hydrocarbon.

References Cited by the Examiner
UNITED STATES PATENTS

| | | | |
|---|---|---|---|
| 411,426 | 9/1889 | Dahl | 136—86 |
| 1,174,631 | 3/1916 | Snelling | 23—210 X |
| 2,289,610 | 7/1942 | Wallace | 136—86 |
| 2,384,463 | 9/1945 | Gunn et al. | 136—86 |
| 2,901,524 | 8/1959 | Gorin et al. | 136—86 |
| 3,020,327 | 2/1962 | Reutschi | 136—120 |
| 3,146,131 | 8/1964 | Linden et al. | 136—86 |
| 3,148,089 | 9/1964 | Oswin | 136—86 |

WINSTON A. DOUGLAS, *Primary Examiner.*

JOHN R. SPECK, *Examiner.*

H. FEELEY, *Assistant Examiner.*